(12) United States Patent
Chen

(10) Patent No.: US 7,621,595 B1
(45) Date of Patent: Nov. 24, 2009

(54) BICYCLE SEAT HAVING POSITION AND ANGLE ADJUSTMENT FUNCTIONS

(75) Inventor: Ching-Shu Chen, Changhua (TW)

(73) Assignee: Chosen Co., Ltd., Changhua Hsien (TW)

( * ) Notice: Subject to any disclaimer, the term of this patent is extended or adjusted under 35 U.S.C. 154(b) by 4 days.

(21) Appl. No.: 11/946,941

(22) Filed: Nov. 29, 2007

(51) Int. Cl.
*B62J 1/00* (2006.01)

(52) U.S. Cl. ............................ 297/215.15; 297/215.14; 297/215.13

(58) Field of Classification Search ............ 297/215.15, 297/215.13, 215.14
See application file for complete search history.

(56) References Cited

U.S. PATENT DOCUMENTS

| | | | | |
|---|---|---|---|---|
| 4,983,063 A | * | 1/1991 | Phillips | 403/4 |
| 5,190,346 A | * | 3/1993 | Ringle | 297/215.14 |
| 5,501,506 A | * | 3/1996 | Kao | 297/215.15 |
| 5,664,829 A | | 9/1997 | Thomson et al. | |
| 5,979,978 A | * | 11/1999 | Olsen et al. | 297/215.15 |
| 5,988,741 A | | 11/1999 | Voss et al. | |
| 6,702,376 B1 | | 3/2004 | Shen | |
| 7,025,522 B2 | * | 4/2006 | Sicz et al. | 403/109.2 |
| 7,059,672 B2 | | 6/2006 | Saccucci | |
| 7,431,391 B2 | * | 10/2008 | Hsiao | 297/215.15 |
| 2006/0006707 A1 | * | 1/2006 | Lin | 297/215.14 |

* cited by examiner

*Primary Examiner*—David Dunn
*Assistant Examiner*—James Alex
(74) *Attorney, Agent, or Firm*—Alan Kamrath; Kamrath & Associates PA

(57) ABSTRACT

A bicycle seat includes an upright post, a support base mounted on an upper end of the upright post, a rotation base rotatably mounted on the support base, a seat body movably mounted on the rotation base, a retaining member mounted on the seat body, and two locking bolts in turn extending through the support base, the seat body and the retaining member to clamp the seat body between the rotation base and the retaining member. Thus, after each of the two locking bolts is unscrewed, the seat body is movable forward and backward relative to the upright post so as to adjust the position of the seat, and is rotatable relative to the upright post so as to adjust the inclined angle of the seat.

14 Claims, 6 Drawing Sheets

BICYCLE SEAT HAVING POSITION AND ANGLE ADJUSTMENT FUNCTIONS

BACKGROUND OF THE INVENTION

1. Field of the Invention

The present invention relates to a seat and, more particularly, to a seat for a bicycle.

2. Description of the Related Art

A conventional seat for a bicycle comprises a seat cushion mounted on an upright seat post which is inserted into a seat tube of the bicycle. However, the seat cushion is fixed on the upright seat post so that the position and angle of the seat cushion are fixed and cannot adjusted according to a user's stature and requirement, thereby easily causing an uncomfortable sensation to the user.

The closest prior art references of which the applicant is aware were disclosed in U.S. Pat. Nos. 5,664,829; 5,988,741; 6,702,376 and 7,059,672.

BRIEF SUMMARY OF THE INVENTION

In accordance with the present invention, there is provided a bicycle seat, comprising an upright post, a support base mounted on an upper end of the upright post, a rotation base rotatably mounted on the support base, a seat body movably mounted on the rotation base, a retaining member mounted on the seat body, and two locking bolts in turn extending through the support base, the seat body and the retaining member to clamp the seat body between the rotation base and the retaining member.

The primary objective of the present invention is to provide a bicycle seat having position and angle adjustment functions.

Another objective of the present invention is to provide a bicycle seat, wherein after each of the two locking bolts is unscrewed from the screw bore of the respective fastening rod, the seat body is movable forward and backward relative to the upright post so as to adjust the position of the seat, and is rotatable relative to the upright post so as to adjust the inclined angle of the seat.

A further objective of the present invention is to provide a bicycle seat, wherein a user only needs to unscrew each of the two locking bolts from the screw bore of the respective fastening rod so as to adjust the position and the inclined angle of the seat simultaneously, thereby facilitating the user adjusting the position and the inclined angle of the seat.

A further objective of the present invention is to provide a bicycle seat, wherein the user only needs to screw or unscrew each of the two locking bolts to lock or unlock the seat so that adjustment of the position and the inclined angle of the seat is operated easily and quickly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
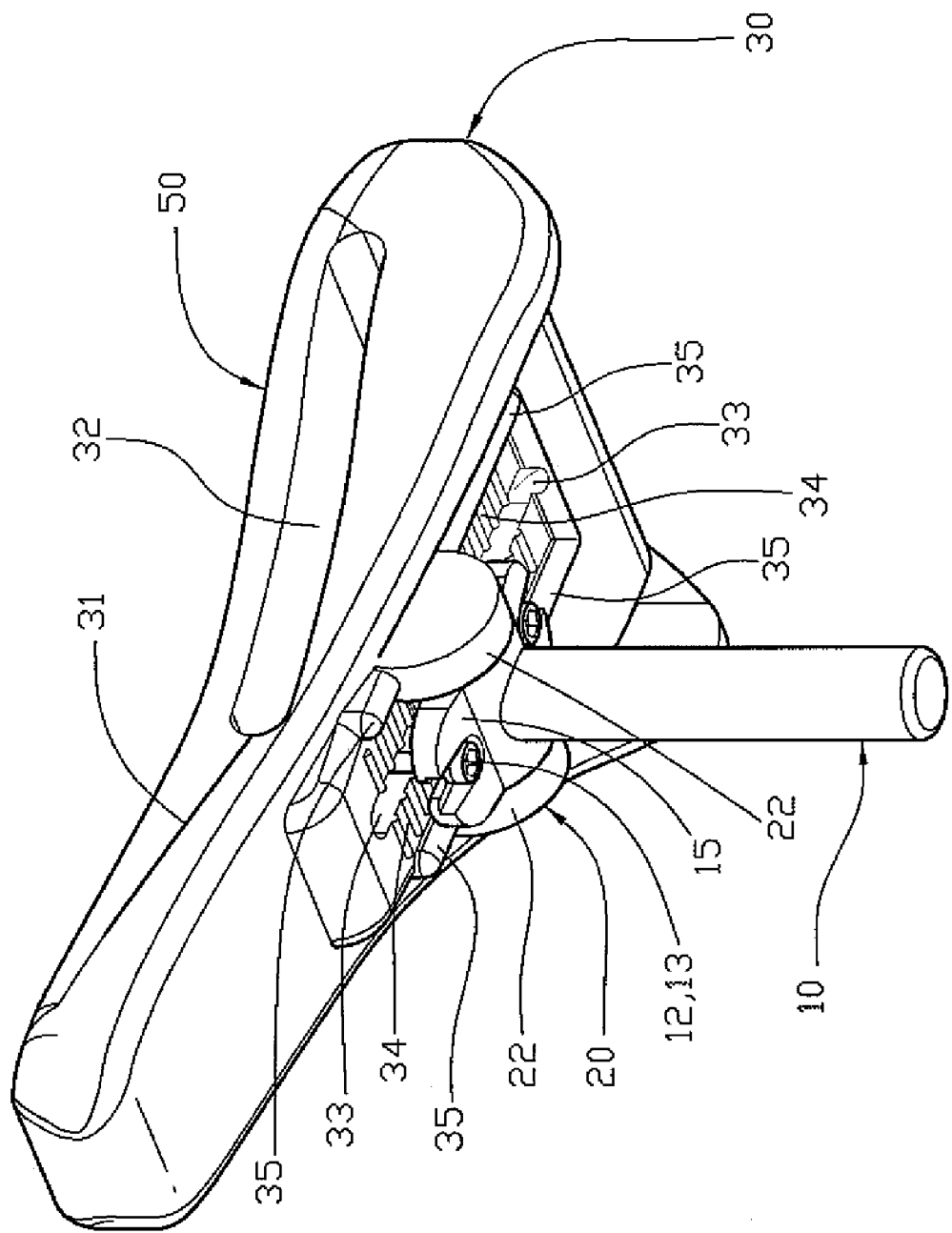
FIG. 1 is a perspective view of a bicycle seat in accordance with the preferred embodiment of the present invention.
Figure 2:
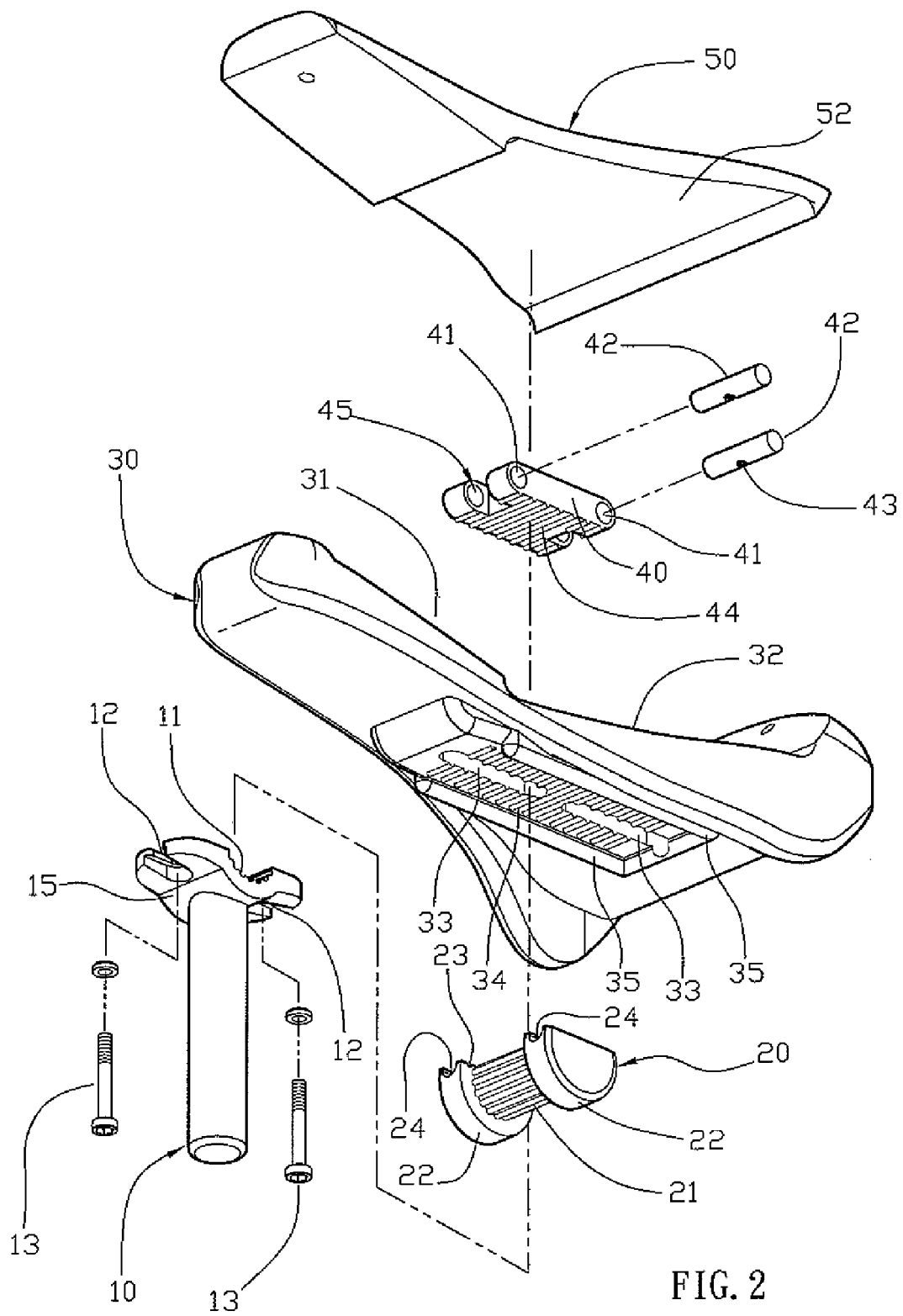
FIG. 2 is an exploded perspective view of the bicycle seat as shown in FIG. 1.
Figure 3:
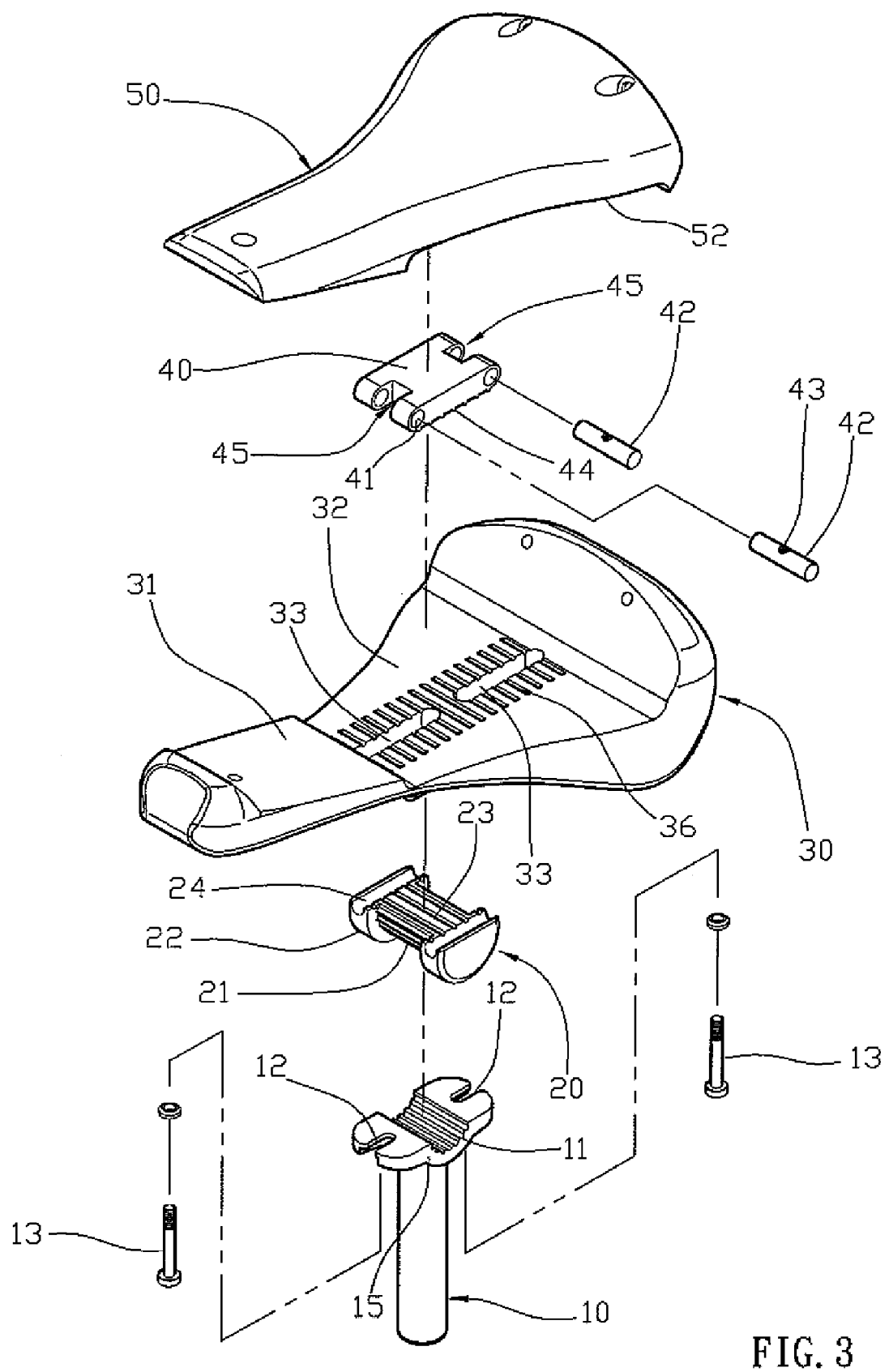
FIG. 3 is an exploded perspective view of the bicycle seat as shown in FIG. 1.
Figure 4:
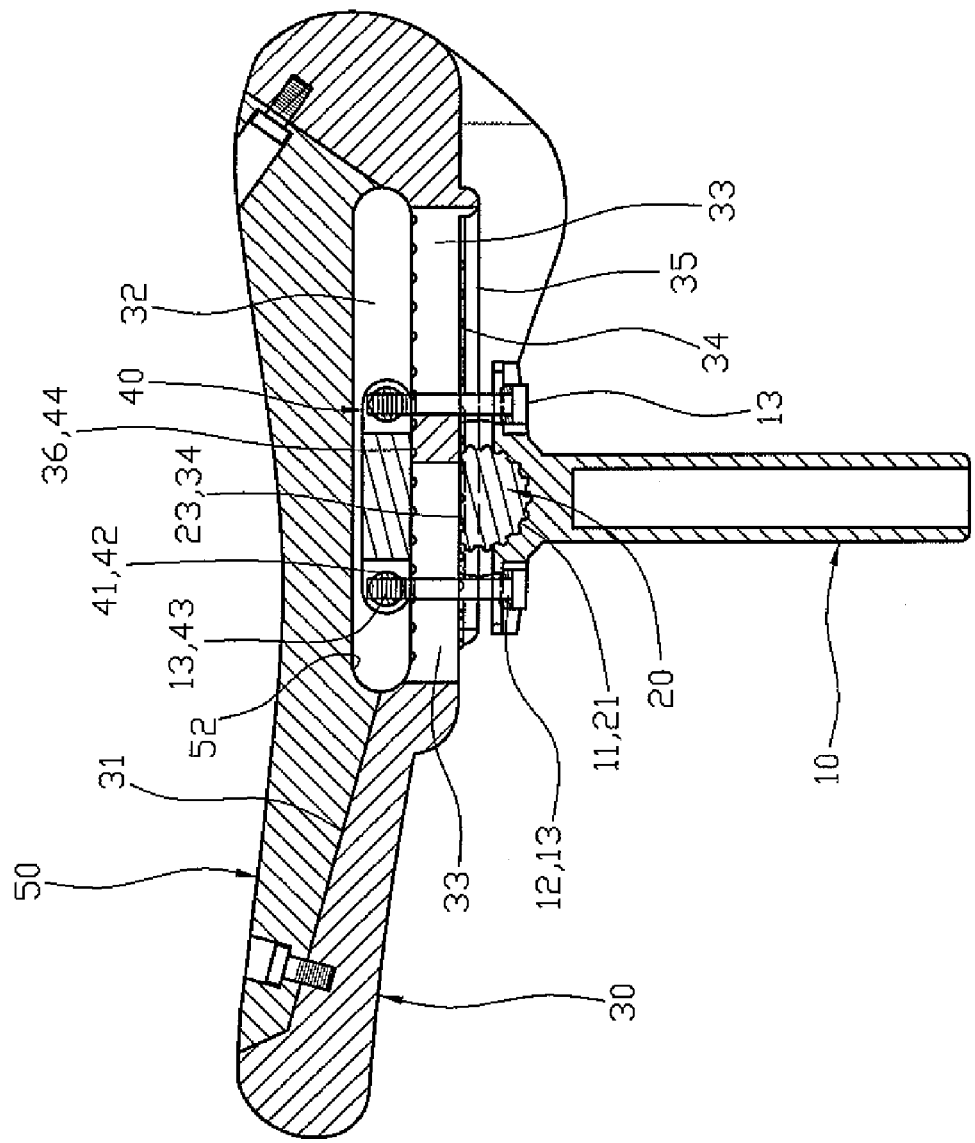
FIG. 4 is a side cross-sectional view of the bicycle seat as shown in FIG. 1.

Referring to the drawings and initially to FIGS. 1-4, a bicycle seat in accordance with the preferred embodiment of the present invention comprises an upright post 10, a support base 15 mounted on an upper end of the upright post 10, a rotation base 20 rotatably mounted on the support base 15, a seat body 30 movably mounted on the rotation base 20, a retaining member 40 mounted on the seat body 30, two locking bolts 13 in turn extending through the support base 15, the seat body 30 and the retaining member 40 to clamp the seat body 30 between the rotation base 20 and the retaining member 40, and a cover 50 mounted on the seat body 30 to encompass the retaining member 40 between the seat body 30 and the cover 50.

The support base 15 has a middle portion provided with a toothed engaging recess 11 and has two opposite ends each provided with an opening 12 to allow passage of a respective one of the two locking bolts 13. The engaging recess 11 of the support base 15 has a substantially semi-circular shape.

The rotation base 20 has a first side having a middle portion provided with a toothed engaging block 21 engaged with the engaging recess 11 of the support base 15. The first side of the rotation base 20 is provided with two protruding limit flanges 22 located at two opposite ends of the engaging block 21 respectively and abutting two opposite sides of the engaging recess 11 of the support base 15 respectively. The engaging block 21 of the rotation base 20 has a substantially semi-circular shape, and each of the two limit flanges 22 of the rotation base 20 has a substantially semi-circular shape. The rotation base 20 has a second side having a middle portion provided with a toothed locking face 23. The second side of the rotation base 20 is provided with two elongate limit grooves 24 located at two opposite ends of the locking face 23.

The seat body 30 is provided with two elongate guide slots 33 each extending through a whole thickness of the seat body 30 and each slidable on a respective one of the two locking bolts 13. The seat body 30 has a first side having a middle portion provided with a toothed locking surface 34 engaged with the locking face 23 of the rotation base 20. The first side of the seat body 30 is provided with two elongate limit ribs 35 located at two opposite ends of the locking surface 34 respectively and each slidable in a respective one of the two limit grooves 24 of the rotation base 20. The seat body 30 has a second side provided with a receiving chamber 32 to receive the retaining member 40. The receiving chamber 32 of the seat body 30 has a bottom wall provided with a toothed retaining surface 36. The second side of the seat body 30 has a periphery provided with a mounting recess 31 for mounting the cover 50.

The bicycle seat further comprises two fastening rods 42 each mounted on the retaining member 40 and each provided with a screw bore 43 screwed onto a respective one of the two locking bolts 13.

The retaining member 40 has a side provided with a toothed retaining face 44 engaged with the retaining surface 36 of the seat body 30. The retaining member 40 has a substantially H-shaped cross-sectional profile and has two opposite ends each provided with a through hole 41 to allow passage of a respective one of the two fastening rods 42. Each of the two opposite ends of the retaining member 40 has a middle portion provided with a cutout 45 connected to the through hole 41 to expose the screw bore 43 of the respective fastening rod 42.

The cover 50 has a side provided with a receiving space 52 connected to the receiving chamber 32 of the seat body 30 to receive the retaining member 40.

Each of the two locking bolts 13 extends through the respective opening 12 of the support base 15 and a respective one of the two guide slots 33 of the seat body 30 and is screwed into the screw bore 43 of a respective one of the two fastening rods 42 to combine the support base 15 and the retaining member 40 together and to clamp the seat body 30 between the rotation base 20 and the retaining member 40.

Figure 5:
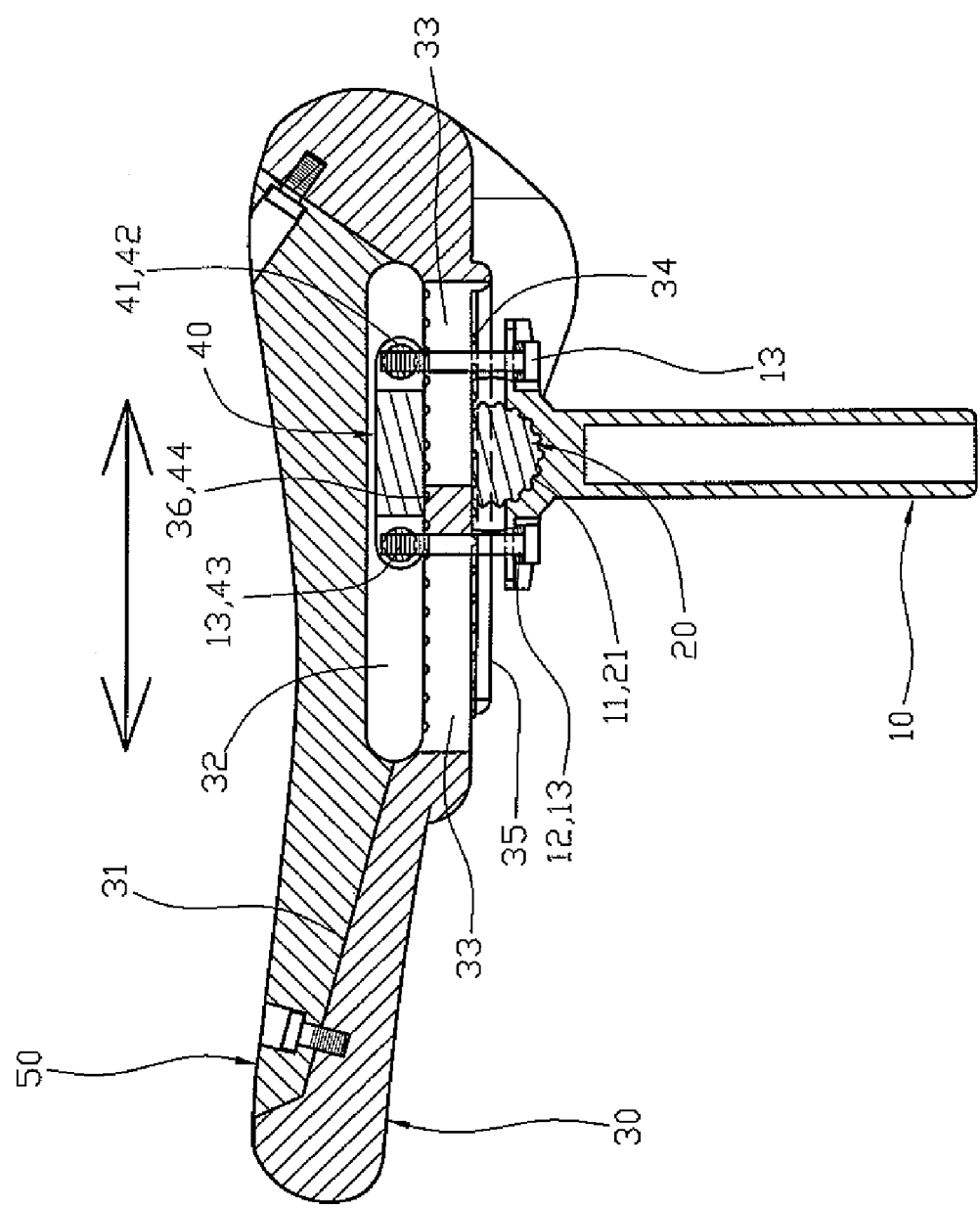
FIG. 5 is a schematic operational view of the bicycle seat as shown in FIG. 4.
Figure 6:
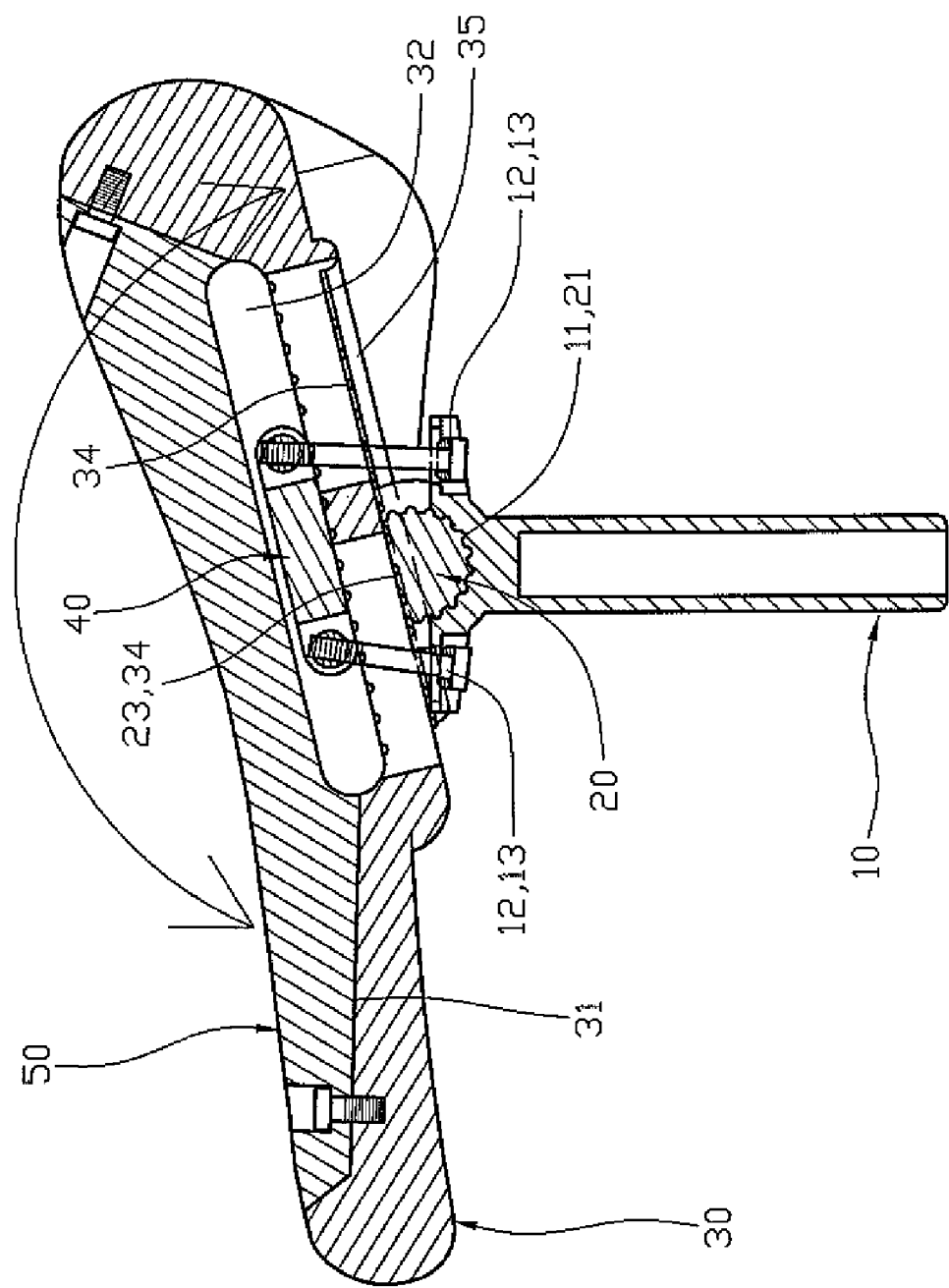
FIG. 6 is a schematic operational view of the bicycle seat as shown in FIG. 4.

In operation, referring to FIGS. 5 and 6 with reference to FIGS. 1-4, each of the two locking bolts 13 is unscrewed from the screw bore 43 of the respective fastening rod 42 to unlock the seat body 30 from the rotation base 20 and the retaining member 40, to disengage the locking surface 34 of the seat body 30 from the locking face 23 of the rotation base 20 and to disengage the retaining face 44 of the retaining member 40 from the retaining surface 36 of the seat body 30.

In such a manner, after each of the two locking bolts 13 is unscrewed from the screw bore 43 of the respective fastening rod 42, the seat body 30 is movable between the rotation base 20 and the retaining member 40 and is movable forward and backward relative to the upright post 10 so as to adjust the position of the seat as shown in FIG. 5. At this time, each of the two elongate limit ribs 35 of the seat body 30 is slidable in a respective one of the two limit grooves 24 of the rotation base 20, and each of the two guide slots 33 of the seat body 30 is slidable on a respective one of the two locking bolts 13 to guide movement of the seat body 30.

Alternatively, each of the two locking bolts 13 is unscrewed from the screw bore 43 of the respective fastening rod 42 to disengage the engaging block 21 of the rotation base 20 from the engaging recess 11 of the support base 15, so that the rotation base 20 is rotatable relative to the support base 15. In such a manner, after each of the two locking bolts 13 is unscrewed from the screw bore 43 of the respective fastening rod 42, the seat body 30 together with the rotation base 20 and the retaining member 40 is rotatable relative to the upright post 10 so as to adjust the inclined angle of the seat as shown in FIG. 6. At this time, each of the two fastening rods 42 is rotatable in the through hole 41 of the retaining member 40 to facilitate rotation of the retaining member 40. In addition, the two limit flanges 22 of the rotation base 20 abut the two opposite sides of the engaging recess 11 of the support base 15 respectively to facilitate rotation of the rotation base 20.

Accordingly, after each of the two locking bolts 13 is unscrewed from the screw bore 43 of the respective fastening rod 42, the seat body 30 is movable forward and backward relative to the upright post 10 so as to adjust the position of the seat, and is rotatable relative to the upright post 10 so as to adjust the inclined angle of the seat. In addition, a user only needs to unscrew each of the two locking bolts 13 from the screw bore 43 of the respective fastening rod 42 so as to adjust the position and the inclined angle of the seat simultaneously, thereby facilitating the user adjusting the position and the inclined angle of the seat. Further, the user only needs to screw or unscrew each of the two locking bolts 13 to lock or unlock the seat so that adjustment of the position and the inclined angle of the seat is operated easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A bicycle seat, comprising:
an upright post;
a support base mounted on an upper end of the upright post;
a rotation base rotatably mounted on the support base;
a seat body movably mounted on the rotation base;
a retaining member mounted on the seat body;
two locking bolts in turn extending through the support base, the seat body and the retaining member to clamp the seat body between the rotation base and the retaining member;
two fastening rods each mounted on the retaining member and each provided with a screw bore screwed onto a respective one of the two locking bolts;
wherein the seat body is provided with two elongate guide slots each extending through a whole thickness of the seat body and each slidable on a respective one of the two locking bolts;
wherein the support base has a middle portion provided with a toothed engaging recess;
the rotation base has a first side having a middle portion provided with a recessed toothed engaging block engaged with the engaging recess of the support base;
the engaging block of the rotation base has a width smaller than that of the rotation base;
wherein the first side of the rotation base is provided with two protruding limit flanges located at and protruding outwardly from two opposite ends of the engaging block respectively and abutting two opposite sides of the engaging recess of the support base respectively;
each of the two limit flanges of the rotation base protrudes outwardly from the engaging recess of the support base;
the engaging recess of the support base has a substantially semi-circular shape;
the engaging block of the rotation base has a substantially semi-circular shape;
each of the two limit flanges of the rotation base has a substantially semi-circular shape and has a diameter greater than that of the engaging block.

2. The bicycle seat in accordance with claim 1, wherein the rotation base has a second side having a middle portion provided with a toothed locking face;
the locking face of the rotation base has a width smaller than that of the rotation base;
the seat body has a first side having a middle portion provided with a toothed locking surface engaged with the locking face of the rotation base;
each of the two guide slots of the seat body extends through the locking surface of the seat body.

3. The bicycle seat in accordance with claim 2, wherein the second side of the rotation base is provided with two straight elongate limit grooves located at and protruding outwardly from two opposite ends of the locking face;
the locking face of the rotation base is located between the two limit grooves of the rotation base;
the first side of the seat body is provided with two elongate straight limit ribs located at and protruding outwardly from two opposite ends of the locking surface respectively and each slidable in a respective one of the two limit grooves of the rotation base;
the locking surface of the seat body is located between the two limit ribs of the seat body.

4. The bicycle seat in accordance with claim 2, wherein the seat body has a second side provided with a receiving chamber to receive the retaining member and to allow movement of the seat body relative to the retaining member.

5. The bicycle seat in accordance with claim 4, wherein
the receiving chamber of the seat body has a bottom wall provided with a toothed retaining surface;
each of the two guide slots of the seat body extends through the retaining surface of the seat body;
the retaining member has a side facing the seat body and provided with a toothed retaining face engaged with the retaining surface of the seat body;
the seat body is located between the rotation base and the retaining member.

6. The bicycle seat in accordance with claim 1, wherein
the retaining member has two opposite ends each provided with a through hole to allow passage of a respective one of the two fastening rods;
each of the two fastening rods is rotatable in the respective through hole of the retaining member.

7. The bicycle seat in accordance with claim 6, wherein
each of the two opposite ends of the retaining member has a middle portion provided with a cutout connected to the respective through hole to expose the screw bore of the respective fastening rod;
each of the two locking bolts in turn extends through the support base, passes by the rotation base, extends through a respective one of the two guide slots of the seat body and the respective cutout of the retaining member and is screwed into the screw bore of a respective one of the two fastening rods.

8. The bicycle seat in accordance with claim 1, wherein the support base has two flat opposite ends each provided with an opening to allow passage of a respective one of the two locking bolts.

9. The bicycle seat in accordance with claim 8, wherein each of the two locking bolts extends through the respective opening of the support base, passes by the rotation base, extends through a respective one of the two guide slots of the seat body and the retaining member and is screwed into the screw bore of a respective one of the two fastening rods to combine the support base and the retaining member together and to clamp the seat body between the rotation base and the retaining member so that the seat body is located between the rotation base and the retaining member.

10. The bicycle seat in accordance with claim 4, further comprising a cover mounted on the seat body to encompass the retaining member between the seat body and the cover so that the retaining member is located between the seat body and the cover.

11. The bicycle seat in accordance with claim 10, wherein the second side of the seat body has a periphery provided with a mounting recess encompassing the receiving chamber for mounting the cover.

12. The bicycle seat in accordance with claim 11, wherein the cover has a side provided with a receiving space connected and juxtaposed to the receiving chamber of the seat body to receive the retaining member.

13. The bicycle seat in accordance with claim 1, wherein the retaining member has a substantially H-shaped cross-sectional profile.

14. The bicycle seat in accordance with claim 9, wherein
each of the two locking bolts is unscrewed from the screw bore of the respective fastening rod to unlock the seat body from the rotation base and the retaining member, to disengage the locking surface of the seat body from the locking face of the rotation base, to disengage the retaining face of the retaining member from the retaining surface of the seat body and to disengage the engaging block of the rotation base from the engaging recess of the support base;
after each of the two locking bolts is unscrewed from the screw bore of the respective fastening rod, the seat body is movable between the rotation base and the retaining member and is movable relative to the upright post;
after each of the two locking bolts is unscrewed from the screw bore of the respective fastening rod, the rotation base is rotatable relative to the support base, and the seat body together with the rotation base and the retaining member is rotatable relative to the upright post.

\* \* \* \* \*